United States Patent Office 3,641,148
Patented Feb. 8, 1972

3,641,148
AMINOPOLYCYCLODECANES
Robert John Stedman, Paoli, Pa., assignor to Smith Kline & French Laboratories, Philadelphia, Pa.
No Drawing. Original application Oct. 11, 1965, Ser. No. 494,881, now Patent No. 3,456,008, dated July 15, 1969. Divided and this application Mar. 5, 1969, Ser. No. 813,390
Int. Cl. C07c 87/40
U.S. Cl. 260—563 P
2 Claims

ABSTRACT OF THE DISCLOSURE 1-amino and aminomethylpentacyclo $$[6.2.4.0^{2,7}.0^{4,10}.0^{5,9}]$$

decanes, 3-amino and aminomethyltetracyclo $$[5.3.0.0^{2,6}.0^{4,9}]$$

decanes, and 1-amino and aminomethyltetracyclo-$[5.2.0.0^{2,6}.0^{4,9}]$-nonanes are prepared starting from tetrachlorocyclopentadienone cyclic ethylene ketal and 1,4-cyclohexadiene and proceeding with ring-closure, hydrolysis and Favorskii reactions. The products are antivirals.

---

This is a division of application Ser. No. 494,881, filed Oct. 11, 1965 now U.S. Pat. No. 3,456,008, July 15, 1969.

This invention relates to polycyclodecaneamines having antiviral activity. In particular, the invention relates to 1-amino and 1-aminomethylpentacyclo- $$[6.2.0.0^{2,7}.0^{4,10}.0^{5,9}]$$

decanes, 3-amino and 3-aminomethyltetracyclo $$[5.3.0.0^{2,6}.0^{4,9}]$$

decanes, and 1 - amino and 1 - aminomethyltetracyclo-$[5.2.0.0^{2,6}.0^{4,9}]$nonanes having activity against influenza viruses, and to intermediates for their preparation.

The principal compounds of the invention are represented by the following structural formulas:

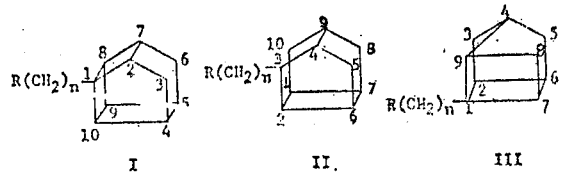

Where R is amino, lower alkyl amino, dilower alkylamino, and lower acylamino; and n is 0 or 1. The terms "lower alkyl" and "lower acyl" are intended to refer to those alkyl groups having 1 to about 6 carbon atoms and those acyl groups having 2 to about 7 carbon atoms therein, particularly the methyl, ethyl, propyl, butyl, pentyl, hexyl, acetyl, propionyl, and benzoyl groups.

The preferred compounds of the invention are those of Formulas I, II, and III in which R is amino and n is 0. Also important are the corresponding methylamino and dimethylamino compounds.

The invention also relates to certain intermediate compounds which are useful for the preparation of the antiviral compounds of Formulas I, II, and III. Among these intermediates are compounds IV–VI, below.

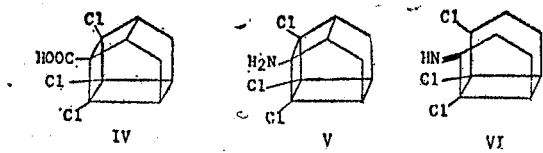

Compounds IV and V are useful for preparing compounds of both Formulas I, II, and III, while Compound VI is useful for preparing compounds of Formulas II and III.

The compounds of the invention are prepared by processes outlined and described below.

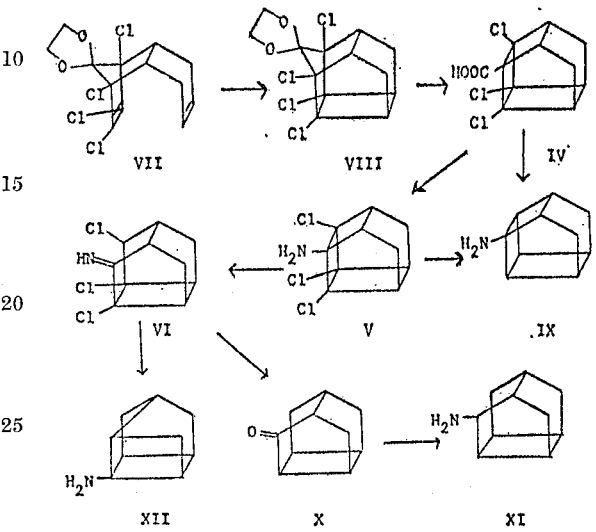

Tetrachlorocyclopentadienone cyclic ethylene ketal and an excess of 1,4-cyclohexadiene are condensed in a Diels-Alder reaction to give 1,8,9,10 - tetrachlorotricyclo-$[6.2.1.0^{2,7}]$undeca-4,9-dien-11-one cyclic ethylene ketal (VII). This diene is then irradiated with ultraviolet light to give the cage compound 1,8,9,10-tetrachloropentacyclo$[6.2.1.0^{2,7}.0^{4,10}.0^{5,9}]$undecan - 11-one cyclic ethylene ketal (VIII). Hydrolysis of the ketal by means of an acid such as sulfuric acid forms the 11-ketone, and this α-chloro ketone is subjected to reflux in a solvent such as toluene containing a strong base such as sodium hydroxide. The resulting compound is 8,9,10 - trichloropentacyclo-$[6.2.0.0^{2,7}.0^{4,10}.0^{5,9}]$decane-1-carboxylic acid (IV). This important intermediate compound, which is considered part of the present invention, is then fully dechlorinated with lithium and tert.-butanol or with another metal-alcohol combination suitable for dechlorination. The dechlorinated acid is then converted to the azide by conventional means, e.g. reaction with thionyl chloride followed by treatment of the resulting acid chloride with sodium azide. The azide is then heated in a solvent such as toluene to give an isocyanate, and the isocyanate is hydrolyzed with an acid such as hydrochloric acid to give the 1-aminopentacyclodecane IX. Alternatively, the trichloroacid IV may be converted to the trichloroamine V by conversion to the azide, isocyanate, and then to the amine as described above, and Compound V is then dechlorinated to IX.

Compound IX, 1-aminopentacyclo$[6.2.0.0^{2,7}.0^{4,10}.0^{5,9}]$ decane, which is the principal compound of the invention, may be converted to any of a variety of pharmaceutically acceptable acid addition salts by adding an acid, either as such or in the form of an alcoholic, ethereal, or acetone solution, to a solution of the basic compound IX. This amino compound may also be converted to other compounds of Formula I by alkylation with lower alkyl halides or sulfates or acylation with acyl halides or anhydrides. Dilower alkyl compounds are prepared by acylating an alkylamine, and then reducing the acylalkylamine with a reagent such as lithium aluminum hydride. A methylamino compound is prepared by reaction of methanol with an isocyanate, followed by reduction of the resulting carbamate with lithium aluminum hydride.

The aminomethyl compounds of Formula I in which $n=1$ are prepared by converting the dechlorinated acid pentacyclo[6.2.0.0$^{2,7}$.0$^{4,10}$.0$^{5,9}$]decane-1-carboxylic acid to the corresponding amide, preferably by treating the acid with thionyl chloride, and the resulting acid chloride with cold aqueous or anhydrous ammonia. The amide is then reduced to the aminomethyl compound by reduction with a reagent such as lithium aluminum hydride. Substituted aminomethyl compounds are prepared conventionally as described above. Alternatively, the carboxylic acid is converted to the carbinol by reduction with lithium aluminum hydride or diborane, the alcohol is converted to the bromide by reaction with hydrogen bromide or phosphorus tribromide, and the aminomethyl compound prepared by reaction with ammonia.

Compounds of Formula II are prepared by means of the unexpected ring-opening reaction effected by heating the trichloroamine V in a base such as pyridine for a period of 15–24 hours. Ring-opening occurs to give the intermediate compound 3-amino-1,2,10-trichlorotetracyclo [5.3.0.0$^{3,6}$.0$^{4,9}$]decane (VI). This imine is hydrolyzed with an acid such as hydrochloric acid to give the 3-ketone, a ketal is formed by conventional means to protect the ketone in the subsequent reaction, the trichloroketal is dechlorinated with lithium and tert-butanol, the ketal is hydrolyzed to the dechlorinated 3-ketone X with an acid such as sulfuric acid, the ketone is converted to the oxime with hydroxylamine, and the oxime is reduced to the amine XI with a reagent such as lithium aluminum hydride.

The aminomethyl compounds of Formula II in which $n=1$ are prepared by treating the ketone X with methoxymethylene triphenylphosphorane, generated from methoxymethyl triphenylphosphonium chloride and butyl lithium in solvents such as tetrahydrofuran and diglyme. The resulting 3-methoxymethylene compound is then converted to a 3-carboxaldehyde by means of perchloric acid. The aldehyde is then treated with hydroxylamine hydrochloride to form an oxime, and the oxime is reduced to the aminomethyl compound with a reagent such as lithium aluminum hydride. Salts and substituted amino and aminomethyl compounds embraced by Formula II are prepared conventionally as described above.

Compounds of Formula III are prepared by hydrolyzing the trichloro imine VI to the corresponding ketone by means of a mineral acid such as hydrochloric or sulfuric, and the resulting trichloro ketone is then refluxed in a solvent such as toluene containing a strong base such as sodium hydroxide to give the ring-contracted 2,3-dichlorotetracyclo[5.2.0.0$^{2,6}$.0$^{4,9}$]nonane-1-carboxylic acid. This acid is then dechlorinated and the acid converted to the amine XII by methods described above.

The aminomethyl compounds of Formula III, in which $n$ is 1, are prepared by converting the above dechlorinated acid to its amide and then reducing the amide as described above.

Among the pharmaceutically acceptable acids which may be used to form salts with the amino products are hydrochloric, sulfuric, hydrobromic, citric, pamoic, maleic, cyclohexylsulfamic, nitric, acetic, tartaric, and succinic.

Since the carbon atoms to which the amino or aminomethyl group are attached are asymmetric carbon atoms, it will be apparent that the product compounds of this invention exist in the form of racemic mixtures. Inasmuch as separation of racemic mixtures by various methods is known to the art of organic chemistry, the present invention is intended to embrace the racemic mixtures as well as the separated optically active forms.

The structures of the compounds described herein have been determined by means of elemental analysis and spectroscopic analysis, as well as from a knowledge of the starting materials and the nature of the reactions employed. However, it should be understood that the present invention consists of the actual chemical compounds prepared by the disclosed processes, whatever their structures.

The antiviral product compounds of the invention are particularly active against influenza viruses. The principal compound of the invention, compound IX, is effective in mice at a dose of 25 mg./kg., administered subcutaneously in the form of an aqueous solution of its hydrochloride salt.

The following examples are intended to illustrate the preparation of the compounds of the invention. Various modifications in the compounds and in the processes for preparing them which are obvious to those skilled in the art of organic chemistry are intended to be part of the present invention.

EXAMPLE 1

1,8,9,10-tetrachlorotricyclo[6.2.1.0$^{2,7}$]undeca-4,9-dien-11-one cyclic ethylene ketal A mixture of 30 g. (0.114 mole) of tetrachlorocyclopentadienone cyclic ethylene ketal (Chem. and Ind. 1964, 709) and 106 ml. (1.12 moles) of 1,4-cyclohexadiene are refluxed for 1 hour and the solution than evaporated. The resulting white solid is stirred for one half hour in 500 ml. of cyclohexane, a small amount of white solid filtered off, and the filtrate evaporated. The resulting white residue is washed with ice cold methanol, dried, and recrystallized from methanol to give the title compound, M.P. 99–101.5°.

EXAMPLE 2

1,8,9,10-tetrachloropentacyclo[6.2.1.0$^{2,7}$.0$^{4,10}$.0$^{5,9}$] undecan-11-one cyclic ethylene ketal A solution of 6 g. of the diene of Example 1 in 500 ml. of acetone is irradiated with a 450 watt Hanovia mercury vapor lamp in a quartz apparatus for an hour. (Concentrations of the diene in acetone greater than 1.2 g./100 ml. result in lower product yield.) The solvent is evaporated in vacuo and the residue recrystallized, using charcoal, from absolute alcohol to give the title compound, M.P. 216–18°.

EXAMPLE 3

8,9,10-trichloropentacyclo[6.2.0.0$^{2,7}$.0$^{4,10}$.0$^{5,9}$]dencane-1-carboxylic acid A suspension of 19.3 g. (.0565 mole) of the ketal of Example 2 in 200 ml. of conc. sulfuric acid is stirred at room temperature for 64 hours. The mixture is poured into ca. 1 liter of ice water, stirred, and cooled. The crystalline ketone is collected and then dried in vacuo at 25° over phosphorus pentoxide. This material may be used directly for the next reaction, but when recrystallized from carbon tetrachloride, yields the pure tetrachloro ketone, M.P. 197–198.5°.

A mixture of 14.6 g. (0.49 mole) of this tetrachloro ketone, 40 g. of crushed sodium hydroxide pellets, and 350 ml. of toluene is refluxed with vigorous stirring for 20 minutes. After having been cooled, the mixture is poured into 1 liter of ice water and stirred. The toluene layer is removed and the aqueous phase is acidified with conc. hydrochloric acid and cooled. The mixture is stirred for a half hour and the solid material collected, washed with water, and dried. The solid is then recrystallized, using charcoal, from methanol-water (2:1) to give the title product, M.P. 246–8° d.

EXAMPLE 4

Pentacyclo[6.2.0.0$^{2,7}$.0$^{4,10}$.0$^{5,9}$]decane-1-carboxylic acid

To a solution of 17.6 g. (.0624 mole) of the trichloro acid of Example 3 in 375 ml. of dry tetrahydrofuran and 35.3 ml. (.375 mole) of dry tert-butanol under nitrogen is added 5.2 g. (0.75 mole) of lithium wire cut into 1-inch pieces. After spontaneous reflux has begun and been controlled if necessary with cooling, the reaction is refluxed using an external heat source for an hour. The reaction mixture is cooled and an additional 35.3 ml. of tert-butanol and 5.2 g. of lithium are added. The mixture is then refluxed for an hour, cooled, and poured into 2 liters of ice water. After all the lithium has been decomposed, the solution is acidified and extracted with a 1:1 ether-benzene mixture. The organic phase is washed several times with dilute hydrochloric acid and filtered, and the solvents evaporated in vacuo. The resultant acid material is dissolved in 300 ml. of ethyl acetate and cyclohexylamine added until the mixture is alkaline. The precipitated cyclohexylamine salt of the title acid is collected, washed with ethyl acetate, and dried. The salt decomposes at 175°. The free acid obtained by acidifying an aqueous solution of the salt, extracting the acid with benzene-ether, and evaporating the solvents.

EXAMPLE 5

1-aminopentacyclo[6.2.0.0$^{2,7}$.0$^{4,10}$.0$^{5,9}$]decane

The dechlorinated acid of Example 4 (6.8 g., .0385 mole) is stirred with 90 ml. of thionyl chloride at room temperature under a calcium chloride tube for 16 hours. The thionyl chloride is stripped off in vacuo, azeotroping the last traces with benzene. The acid chloride is dissolved in 300 ml. of acetone and chilled in an ice-salt bath to 0-5°. A solution of 2.9 g. (.044 mole) of sodium azide in 29 ml. of water is added slowly to the stirred solution of acid chloride. The cloudy orange mixture is stirred at 5° for 15 minutes and then poured into 400 ml. of ice water. The mixture is extracted with a total of 500 ml. of toluene, washed several times with a total of 400 ml. of water, dried over magnesium sulfate, and filtered. The clear yellow solution of the acid azide is heated on a steam bath for an hour and then refluxed for 1 hour. The toluene is evaporated, the resulting isocyanate is dissolved in 250 ml. of tetrahydrofuran, and 625 ml. of conc. hydrochloric acid is added. The solution is refluxed for 1 hour, the solvents are evaporated in vacuo to a volume of ca. 250 ml., and more water is added. A water-insoluble brown oil is extracted with benzene and discarded. The aqueous phase is made alkaline with 10% sodium hydroxide and the resulting white oily amine extracted with a mixture of benzene and ether. The organic phase is washed with water and filtered, and the solvents evaporated in vacuo at 35° to give the amine product.

A solution of hexamic acid in 1:4 isopropanol-acetonitrile added to the amine gives a hexamate salt, which is recrystallized from isopropanol-acetonitrile mixtures. The hexamate is reconverted to the free amine, dissolved in a small volume of isopropanol, and added to a small volume of etheral hydrogen chloride. The solvents are evaporated in vacuo and ethyl acetate is added to precipitate the hydrochloride salt, M.P. 257° d.

EXAMPLE 6

1-amino-8,9,10-trichloropentacyclo[6.2.0.0$^{2,7}$.0$^{4,10}$.0$^{5,9}$]decane

A solution of 18.3 g. (.0655 mole) of the trichloro acid of Example 3 in 160 ml. of thionyl chloride is refluxed for two and one-half hours. The thionyl chloride is evaporated in vacuo, azeotroping the traces with benzene. The solid acid chloride is dissolved in 525 ml. of acetone, and the solution chilled to 0°. A solution of 4.8 g. (.0728 mole) of sodium azide in 48 ml. of water is added slowly, the temperature being maintained below 6°. The mixture is stirred for 15 minutes at 0-5° and poured into 500 ml. of ice water. The solid azide is then extracted with 800 ml. of toluene and the toluene phase washed well with 500 ml. of water, dried, and filtered. The toluene solution containing the acid azide is refluxed for an hour and one-half and the toluene evaporated to give the crystalline isocyanate. The isocyanate is dissolved in 360 ml. of dry tetrahydrofuran and 90 ml. of conc. hydrochloric acid and the solution refluxed for one hour. The solvents are evaporated in vacuo to ca. 60 ml. Water (500 ml.) is added. The solution is washed with benzene, filtered, and made basic with conc. aqueous ammonia. The solid product amine which precipitates is filtered off and melts at 150–3°.

EXAMPLE 7

3-imino-1,2,10-trichlorotetracyclo[5.3.0.0$^{2,6}$.0$^{4,9}$]decane

A solution of 1.5 g. (0.006 mole) of the trichloro amine of Example 6 in 15 ml. of dry pyridine is refluxed for 21 hours. The pyridine is evaporated in vacuo and a dilute solution of hydrochloric acid is added. Any insoluble material is filtered off and the filtrate is made alkaline with 10% sodium hydroxide. The resulting white gummy solid is extracted with a mixture of benzene, ether, and ethyl acetate. The organic extracts are washed with water, filtered, and evaporated in vacuo. The crystalline residue is recrystallized successively from petroleum ether and hexane, and then sublimed to give the title imine product, M.P. 107–9°.

EXAMPLE 8

1,2,10-trichlorotetracyclo[5.3.0.0$^{2,6}$.0$^{4,9}$]decan-3-one cyclic ethylene ketal A solution of 10 g. of the trichloro imine of Example 7 in 100 ml. of 3 N hydrochloric acid is heated at 90° for 6 hours. The resulting 3-ketone is filtered off, washed with water and dried.

A solution of 25.2 g. of this trichloro ketone, 15 g. of ethylene glycol, and 0.5 g. of p-toluenesulfonic acid in 200 ml. of benzene is refluxed for 24 hours, using a Dean-Stark trap to remove the water formed. The resulting solution is extracted with excess sodium bicarbonate and the organic layer evaporated in vacuo to give the title ketal.

EXAMPLE 9

Tetracyclo[5.3.0.0$^{2,6}$.0$^{4,9}$]decan-3-one

To a solution of 29.6 g. (0.1 mole) of the trichloro ketal of Example 8 in 750 ml. of dry tetrahydrofuran and 55.4 ml. (0.6 mole) of dry tert-butanol is added 8.32 g. (1.2 moles) of lithium wire, cut into 1 inch pieces, the reaction mixture being maintained under nitrogen and stirred vigorously. After 10–20 minutes, spontaneous reflux has begun, and the reaction is refluxed for an additional hour, using an external heat source. The mixture is then cooled and an additional 27.7 ml. of dry tert-butanol and 4.16 g. of lithium are added. The mixture is then refluxed for 1 hour, cooled, and poured into 3.5 liters of ice water. After all the lithium has reacted, the solution is extracted with an ether-benzene mixture. The organic phase is washed, filtered, and evaporated in vacuo to give the cyclic ethylene ketal of the title ketone.

A suspension of 10 g. of the ketal in 100 ml. of 50% sulfuric acid is heated in a 50° oil bath for 1 hour. The mixture is poured into 1 liter of ice water and the product ketone is obtained by extracting with ether, drying, and evaporating the organic extracts.

EXAMPLE 10

3-aminotetracyclo[5.3.0.0$^{2,6}$.0$^{4,9}$]decane

A mixture of 5 g. of the ketone of Example 9, 8 g. of hydroxylamine hydrochloride, and 6 g. of sodium acetate in 100 ml. of methanol is refluxed overnight. The methanol is evaporated in vacuo and the residue partitioned between ether and saturated aqueous ammonium chloride. Evaporation of the dried ether phase gives the oxime of the starting ketone.

A solution of 3 g. of this oxime in 60 ml. of dry tetrahydrofuran is slowly added to a refluxing mixture of 12 g. of lithium aluminum hydride and 300 ml. of dry tetrahydrofuran. Refluxing is continued for 12 hours and the excess reagent is destroyed by the cautious addition of saturated aqueous sodium sulfate. Excess dilute hydrochloric acid is added, the mixture concentrated in vacuo to remove most of the tetrahydrofuran, and the residual aqueous acid solution washed with benzene. The aqueous solution is made basic with excess sodium hydroxide, and the basic solution is then extracted with ether. The ether extracts are then dried and evaporated to give the title amine product. Addition of excess gaseous hydrogen chloride to an ether solution of the amine gives the hydrochloride salt, which is isolated either by filtration or by evaporation and crystallization of the residue.

EXAMPLE 11

1-aminopentacyclo[6.2.0.0$^{2,7}$.0$^{4,10}$.0$^{5,9}$]decane

To a solution of 25.0 g. (0.1 mole) of the trichloro amine of Example 6 in 750 ml. of dry tetrahydrofuran and 55.4 ml. (0.6 mole) of dry tert-butanol is added 8.32 g. (1.2 moles) of lithium wire, cut into 1 inch pieces, the reaction mixture being maintained under nitrogen and stirred vigorously. The reaction is conducted and worked up as in Example 9. Evaporation of the ether and benzene solvents gives the title amine, which is the same compound as that prepared by the procedure of Example 5. Addition of gaseous or ethereal hydrogen chloride to an ether solution of the amine gives the hydrochloride salt.

EXAMPLE 12

1-acetamidopentacyclo[6.2.0.0$^{2,7}$.0$^{4,10}$.0$^{5,9}$]decane 1-aminopentacyclo[6.2.0.0$^{2,7}$.0$^{4,10}$.0$^{5,9}$]decane (2.94 g.) is allowed to stand overnight with 5 g. of acetic anhydride in 100 ml. of pyridine. The reaction mixture is then diluted with ice water and the amide product removed by filtration.

EXAMPLE 13

1-(N-ethylacetamido)pentacyclo[6.2.0.0.$^{2,7}$.0$^{4,10}$.0$^{5,9}$]decane

A solution of 1.89 g. of the amide of Example 12 in 50 ml. of dry tetrahydrofuran is refluxed for 2 hours with 0.45 g. of 53.5% sodium hydride. A solution of 1.56 g. of ethyl iodide in 25 ml. of dry tetrahydrofuran is added to the cooled reaction mixture which is then refluxed for twelve hours. A small amount of water is cautiously added with cooling the solution is filtered, and most of the tetrahydrofuran evaporated in vacuo. A further quantity of water is added, the alkaline solution is extracted with ether, and the extracts dried and evaporated to give the title product.

EXAMPLE 14

1-diethylaminopentacyclo[6.2.0.0$^{2,7}$.0$^{4,10}$.0$^{5,9}$]decane

A solution of 2.17 g. of the N-ethylacetamido compound of Example 13 in 100 ml. of dry tetrahydrofuran is refluxed with 0.5 g. of lithium aluminum hydride for 12 hours. The excess hydride is decomposed by the cautious addition of water, with cooling. The solution is filtered, the filtrate extracted with ether, and the ether extracts evaporated to give the diethylamino product.

Reduction of the 1-acetamido compound of Example 12 in the same manner gives the 1-ethylamino compound.

EXAMPLE 15

1-methylaminopentacyclo[6.2.0.0$^{2,7}$.0$^{4,10}$.0$^{5,9}$]decane

Pentacyclo[6,2,0,0$^{2,7}$.0$^{4,10}$.0$^{5,9}$]decane-1-isocyanate 3.46 g.) is dissolved in 60 ml. of methanol and the solution is then refluxed for 2 hours. The solvent is evaporated in vacuo, 50 ml. of dry tetrahydrofuran is added to the resulting carbamate, and the mixture is refluxed with 0.76 g. of lithium aluminum hydride for four hours. The reaction mixture is decomposed with water and filtered, and the filtrate evaporated to give the title product.

EXAMPLE 16

1-aminomethylpentacyclo[6.2.0.0$^{2,7}$.0$^{4,10}$.0$^{5,9}$]decane

A solution of 5.43 g. of pentacyclo[6.2.0.0$^{2,7}$.0$^{4,10}$.0$^{5,9}$]decane-1-carboxylic acid in 25 ml. of thionyl chloride is refluxed for 2 hours and then allowed to stand overnight at room temperature. The excess thionyl chloride is evaporated in vacuo, the residual oil is taken up in benzene, and the solution further evaporated to give the acid chloride.

This acid chloride is dissolved in 15 ml. of dry tetrahydrofuran and the solution added dropwise to an ice-cold solution of conc. aqueous ammonia (ca. 75 ml.). After stirring for 1 hour, water is added, and the amide either removed by filtration or extracted with an organic solvent.

To a slurry of 3.04 g. of lithium aluminum hydride in 400 ml. of refluxing tetrahydrofuran is added in portions, over 1 hour, 3.26 g. of this amide, all under nitrogen. The mixture is heated at reflux for 24–48 hours, cooled, and the excess hydride decomposed by the cautious addition of water. The resulting white slurry is filtered, the filter cake washed with ether, and the filtrates combined and evaporated in vacuo to give the title 1-aminomethylpentacyclodecane.

EXAMPLE 17

3-aminomethyltetracyclo[5.3.0.0$^{2,6}$.0$^{4,9}$]decane

A stirred suspension of 40 g. (.105 mole) of methoxymethyl triphenylphosphonium chloride in 200 ml. of tetrahydrofuran and 200 ml. of diglyme is treated dropwise with 105 ml. (.10 mole) of ethereal n-butyl lithium in a nitrogen atmosphere, and the mixture allowed to stir for 3 hours at 25°. To the resulting deep red solution is added dropwise a solution of 7.4 g. (.05 mole) of tetracyclo [5.3.0.0$^{2,6}$.0$^{4,9}$]decan-3-one in 40 ml. each of tetrahydrofuran and diglyme. After stirring for 4 hours at 25°, the tetrahydrofuran is removed by heating on the steam bath, 200 ml. of diglyme is added, and the mixture is refluxed for 7 hours. The mixture is cooled, concentrated to one-half volume in vacuo, and treated with methyl bromoacetate to remove any triphenylphosphine. After standing 12 hours, the solid is filtered off, the filtrate washed with water, and the dried organic layer evaporated to give an oil. Column chromatography over alumina gives the 3-methoxymethylene compound.

This vinyl ether is allowed to stand for 15 minutes at room temperature in a saturated solution of ether in perchloric acid, poured into aqueous sodium bicarbonate and extracted with ether. Evaporation of the dried ether extracts gives the 3-carboxaldehyde.

To a solution of 18.75 g. of hydroxylamine hydrochloride in 75 ml. of water and 75 ml. of 10% aqueous sodium hydroxide is added a solution of 8.3 g. of the 3-aldehyde in 100 ml. of 95% alcohol. The mixture is heated at 70–80° for 15 minutes, filtered hot, and then diluted with 350 ml. of cold water. The precipitate is collected and dried to give the 3-oxime.

To a slurry of 3.5 g. of lithium aluminum hydride in 300 ml. of refluxing tetrahydrofuran is added over 20 minutes a solution of 7.1 g. of the 3-oxime in 150 ml. of tetrahydrofuran. The mixture is heated at reflux for 3 hours, cooled, and the excess hydride decomposed by cautious addition of water. The resulting white slurry is filtered, the filter cake washed with ether, and the combined filtrates dried and evaporated to give the title 3-aminomethyltetracyclodecane.

EXAMPLE 18

3-dimethylaminotetracyclo[5.3.0.0$^{2,6}$.0$^{4,9}$]decane

3 - aminotetracyclo[5.3.0.0$^{2,6}$.0$^{4,9}$]decane (1.5 g.) is mixed with 0.5 mole of 90% formic acid and 0.22 mole of 35% formaldehyde solution. The mixture is heated for 12 hours on the steam bath, 50 ml. of conc. hydrochloric acid is then added, and the mixture evaporated to dryness in vacuo. To the residue is added 200 ml. of 1 N sodium hydroxide. The product is obtained by extraction with ether and drying and evaporating the ether.

EXAMPLE 19

1-aminotetracyclo[5.2.0.0$^{2,6}$.0$^{4,9}$]nonane

A mixture of 12.3 g. (.049 mole) of the trichloro ketone of Example 8, 46 g. of crushed sodium hydroxide pellets, and 350 ml. of toluene is refluxed with vigorous stirring for 20 minutes. After cooling, the mixture is poured into 1 liter of ice water and stirred. The toluene layer is removed and the aqueous phase is acidified with conc. hydrochloric acid and cooled. The mixture is stirred and extracted with ether-benzene, the extracts washed, dried, and evaporated to give a solid. The resulting solid is then recrystallized to give 2,3-dichlorotetracyclo-[5.2.0.0$^{2,6}$.0$^{4,9}$]nonane-1-carboxylic acid.

To a solution of 14.0 g. (.06 mole) of this dichloro acid in 350 ml. of dry tetrahydrofuran and 35.3 ml. (0.375 mole) of dry tert-butanol under nitrogen is added 5.2 g. (0.75 mole) of lithium wire cut into 1 inch pieces. After spontaneous reflux has begun and has been controlled if necessary with cooling, the reaction is refluxed using an external heat source for an hour. The mixture is cooled and an additional 35.3 ml. of tert-butanol and 5.2 g. of lithium are added. The mixture is then refluxed for an hour, cooled, and poured into 2 liters of ice water. After all the lithium has been decomposed, the solution is acidified with hydrochloric acid and extracted with a 1:1 ether-benzene mixture. The organic phase is washed, dried, filtered, and evaporated in vacuo to give tetracyclo-[5.2.0.0$^{2,6}$.0$^{4,9}$]nonane-1-carboxylic acid.

A mixture of 6.6 g. (.04 mole) of this dechlorinated acid is stirred with 90 ml. of thionyl chloride as in Example 5. The acid chloride obtained from the work-up is dissolved in acetone and a solution of 2.9 g. of sodium azide in 30 ml. of water added slowly to the stirred solution. The reaction is conducted and the mixture worked up as described in Example 5 and the isolated acid azide heated in toluene for about two hours for conversion to the isocyanate. The isocyanate is then hydrolyzed with conc. hydrochloric acid and the mixture is worked up as described to give the title amine.

This amine is converted to its salts, or alkyl or acyl derivatives as described in Examples 5, 12–15, and 18 for the other amino compounds of the invention. The dechlorinated acid is also converted to the aminomethyltetracyclononane as described in Example 16.

I claim:
1. A compound of the formula

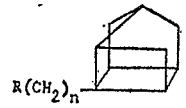

or a pharmaceutically acceptable acid addition salt thereof, where R is amino, lower alkylamino, or dilower alkylamino; and $n$ is 0 or 1.

2. 1-aminotetracyclo[5.2.0.0$^{2,6}$.0$^{4,9}$]nonane or its hydrochloride salt.

References Cited

UNITED STATES PATENTS 3,456,008    7/1969    Stedman _____ 260—563

CHARLES B. PARKER, Primary Examiner

D. R. PHILLIPS, Assistant Examiner